United States Patent [19]
Bayer

[11] Patent Number: 5,921,365
[45] Date of Patent: Jul. 13, 1999

[54] PRESSURE PLATE ASSEMBLY, ESPECIALLY FOR A MOTOR VEHICLE FRICTION CLUTCH WITH AUTOMATIC WEAR COMPENSATION

[75] Inventor: Josef Bayer, Aidhausen, Germany

[73] Assignee: Mannesmann Sachs AG, Schweinfurt, Germany

[21] Appl. No.: 08/969,265

[22] Filed: Nov. 13, 1997

[30] Foreign Application Priority Data

Nov. 27, 1996 [DE] Germany .......................... 196 49 135

[51] Int. Cl.⁶ ................................................. F16D 13/75
[52] U.S. Cl. ............................... 192/111 A; 192/30 W; 192/70.25
[58] Field of Search .......................... 192/70.25, 111 A, 192/30 W, 70.27, 89.23

[56] References Cited

U.S. PATENT DOCUMENTS

| | | | |
|---|---|---|---|
| 4,738,344 | 4/1988 | Maruyamano et al. | 192/109 R |
| 4,742,901 | 5/1988 | Takeuchi et al. | 192/70.25 |
| 5,409,091 | 4/1995 | Reik et al. | 192/111 A X |
| 5,419,418 | 5/1995 | Uenohara et al. | 192/111 A X |
| 5,531,308 | 7/1996 | Gochenour et al. | 192/111 A X |
| 5,695,036 | 12/1997 | Gochenour et al. | 192/70.25 |

FOREIGN PATENT DOCUMENTS

| | | |
|---|---|---|
| 35 38 444 | 4/1986 | Germany . |
| 43 06 688 | 11/1993 | Germany . |
| 2187520 | 9/1987 | United Kingdom . |

OTHER PUBLICATIONS

"Produckte und Problemlösungen für Konstruktion Fertigung Einkauf", *Zulieferer + Maschinenausrüster 86*, (date unknown).

*Primary Examiner*—Richard M. Lorence
*Attorney, Agent, or Firm*—Cohen, Pontani, Lieberman & Pavane

[57] ABSTRACT

A pressure plate assembly comprises a housing and a pressure plate that is axially movably arranged therein. A diaphragm spring is positioned between the housing and the pressure plate and rests on the pressure plate via a wear compensation device. A clearance indicator with a wear detection section is inserted through an opening in the pressure plate. The clearance indicator also includes an activating lever section 30 that interacts with the wear compensation device to compensate for wear that has occurred on friction linings during operation. The clearance indicator is biased by a spring part in a friction clamp seat in the opening or a clamping seat section. The spring part produces a force substantially orthogonal relative to a rotational axis A in a radially outward direction.

19 Claims, 2 Drawing Sheets

PRESSURE PLATE ASSEMBLY, ESPECIALLY FOR A MOTOR VEHICLE FRICTION CLUTCH WITH AUTOMATIC WEAR COMPENSATION

BACKGROUND OF THE INVENTION

1. Field of the Invention

The present invention relates to a pressure plate assembly, especially for a motor vehicle friction clutch with automatic wear compensation. The pressure plate assembly includes a housing, that is connected or connectable to a flywheel for rotation therewith about a rotational axis. A pressure plate is connected to the housing in rotation-proof fashion, but is axially movable relative to the housing. The pressure plate has a friction surface to support the friction linings of a clutch disk that can be clamped between the flywheel and the pressure plate. The pressure plate assembly also includes an energy storage device, especially a diaphragm spring, a spring force of which acts between the housing and the pressure plate for biasing the pressure plate in the direction of an engaged position of the clutch, whereby the energy storage device acts on the pressure plate via a wear compensation device which is mounted intermediate the pressure plate and the energy storage device. The pressure plate assembly further comprises at least one clearance indicator arranged on the pressure plate having an activating lever section that interacts with the wear compensation device, and a wear detection section that penetrates a substantially axial opening in the pressure plate and interacts, preferably, directly with the flywheel for the purpose of detecting wear, the clearance indicator being axially movable in the opening relative to the pressure plate. The pressure plate assembly also comprises at least one bias element for producing a force action to press the clearance indicator to axially fix the clearance indicator relative to the pressure plate in the friction clamping seat in the opening in the pressure plate.

2. Description of the Related Art

A prior art pressure plate assembly of this type is known, for example, from DE 4306688 A1. In this prior art pressure plate assembly, a helical compression spring acts between a free end of the wear detection section of the clearance indicator and the pressure plate. The helical compression spring is arranged so that a spring pressure force of the spring is inclined, relative to a longitudinal axis of the opening in the pressure plate and thus relative to a longitudinal axis of the wear detection section of the clearance indicator. As a result, a tilting moment is produced on the wear detection section around an axis located at a right angle to its longitudinal axis, creating a friction clamping seat for the wear detection section in the opening. To avoid impairing the axial mobility of the clearance indicator (i.e., of the wear detection section) when wear occurs, the spring pressure force provided by the helical compression spring must be relatively slight. However, this means that the friction clamping force exercised by the inclined spring is also limited.

During the operation of motor vehicle friction clutches that have clearance indicators of this type, vibrations can occur that, if located in the resonance vibration range of the clearance indicator, may cause the clearance indicator to vibrate and thus lead to the short-term release of the friction clamping seat. For this reason, the helical compression spring must also exercise an axial force component on the clearance indicator. If, in the absence of an axial propellant force, the clearance indicator is moved in the axial direction by the movement or vibration of the clutch during the brief release of the friction clamping seat, and particularly if the indicator is moved away from the flywheel, the indicator will not correctly detect wear. The helical compression spring thus has a double function. First, it produces the tilting moment. Second, it provides an axial bias for the clearance indicator toward the flywheel.

SUMMARY OF THE INVENTION

The object of the present invention is to provide a pressure plate assembly with at least one clearance indicator biased in a friction clamping seat simply and reliably.

According to an embodiment of the invention, this object is attained by a pressure plate assembly, especially for a motor vehicle friction clutch with automatic wear compensation, which comprises: a housing, which is connected or connectable to a flywheel for rotation therewith around a rotational axis; a pressure plate, which is connected to the housing in rotation-proof fashion and is axially movable relative to the housing, and has a friction surface to support the friction linings of a clutch disk, which can be clamped between the flywheel and the pressure plate; an energy storage device, especially a diaphragm spring, that acts between the housing and the pressure plate and biases the pressure plate in the direction of an engaged clutch position, whereby the energy storage device acts on the pressure plate with intermediate mounting of a wear compensation device. The pressure plate assembly further comprises at least one clearance indicator arranged on the pressure plate having an activating lever section that interacts with the wear compensation device and a wear detection section that penetrates a substantially axial opening in the pressure plate. The wear compensation device interacts, preferably, with the flywheel for the purpose of detecting wear, the clearance indicator being axially movable in the opening relative to the pressure plate. The pressure plate assembly also comprises at least one bias element for producing a force action to press the clearance indicator so as to axially fix the clearance indicator, relative to the pressure plate, in the friction clamping seat in the opening.

Further, according to the invention, the bias element exercises a force action on the clearance indicator in a direction substantially orthogonal to the rotational axis.

The bias element according to the invention thus produces a largely unidirectional force action that is orthogonal relative to the rotational axis. Because the bias element thus produces practically no force in the axial direction, the level of force exercised by the bias element can be selected as desired to ensure a secure friction clamping seat of the wear detection section in the opening in the pressure plate. That is, the level of the force can be set without having to take into account the fact that an axial force component could influence the operation of the clearance indicator. In particular, the force can be set so that even when vibrations occur during clutch operation, the friction clamping seat of the clearance indicator is not released. In other words, the problem of unintended movement by the clearance indicator in the opening provided for it is prevented, and thus no bias is needed in the axial direction. The bias element is therefore optimally designed with respect to its main fiction, which is to provide bias to the friction clamping seat, without having to consider other functions.

The bias element exercises a force action on the clearance indicator that is directed radially relative to the rotational axis. In the preferred embodiment, the force action is directed radially outward.

To allow the structural space available in the pressure plate assembly to be used most effectively and to avoid interference with other clutch components, especially the clutch disk and the like, in the preferred embodiment, the bias element acts on the clearance indicator on a side of the pressure plate facing away from the friction surface.

Preferably, the bias element acts on the wear detection section of the clearance indicator. To this end, the bias element comprises a bias spring element that acts on the clearance indicator and rests on an outer circumferential area of the pressure plate. In an especially simple and economical embodiment, the bias element is an elastically deformable, substantially U-shaped spring part. The spring part has a first U-leg, a second U-leg, and a bottom section. The first U-leg is arranged on the side of the pressure place facing away from the friction surface and with which the spring part acts on the clearance indicator. The second U-leg is arranged on the friction surface side of the pressure plate. The bottom section connects the first U-leg and the second U-leg and rests on the outer circumferential area of the pressure plate. In particular, such an embodiment of the bias element ensures an especially simply structure of the pressure plate arrangement, so that the assembly process is also simple.

When the first U-leg acts on the clearance indicator and the bottom section of the spring part acts on the outer circumferential region, the spring part is moved, for the purpose of producing the bias force, into a bias state in which it exercises a force on the clearance indicator that is directed radially outward relative to the rotational axis.

The spring part is embodied, for example, such that when the spring part is not positioned on the pressure plate, an angle formed between the first U-leg and the bottom section has a first value smaller than 90 degrees, and when the spring part is positioned on the pressure plate and biases the clearance indicator, the angle has a second value, which is larger than the first value and is substantially 90 degrees.

To allow an especially simple and reliable interaction to be established between the spring part and the clearance indicator, it is proposed that the spring part have an opening in the first U-shaped leg, into which the wear detection section of the clearance indicator is inserted, and via which the spring part acts on the wear detection section of the clearance indicator.

A potential problem is that, due to the oscillation or vibration that occurs during clutch operation, for example, the clearance indicator itself may rotate in the opening in the pressure plate around an axis substantially parallel to the rotational axis A. Further, when the wear compensation device comprises a segment rotatable in a circumferential direction with which the activating lever section interacts, a rotational moment can be exercised on the activating lever section that interacts with a wear compensation device. To avoid such unintended rotation of the clearance indicator, further means are provided for securing the clearance indicator against rotation in the opening in the pressure plate around an axis substantially parallel to the rotational axis.

In an embodiment that is especially simple to produce, the means to secure the clearance indicator against rotation comprise at least one securing section, which is designed in integral fashion with the first U-leg and acts on the activating lever section of the clearance indicator.

The bias element can also be subjected to rotational force actions, particularly when it secures the clearance indicator against rotation. It is then advantageous to secure the spring part against rotation around an axis substantially parallel to the rotational axis.

An especially simple and reliable means to secure the spring part against rotation includes a radial recess in the pressure plate, into which one U-leg of the spring part engages. In the preferred embodiment, a radially inner end section of the first U-leg is inserted into the radial recess.

For example, the recess is provided on the side of the pressure plate facing away from the friction surface, and the first U-leg of the spring part engages the recess with its radially inner end section.

The spring part can be produced especially simply and economically of spring steel or the like.

In the case of a clearance indicators whose wear detection section penetrates an opening in the pressure plate and is held there in a friction clamp seating, a bias force in addition to that produced by the bias element is generated during the rotation of the clutch, whereupon a centrifugal force acts upon the clearance indicator. Because the center of mass of the clearance indicator is generally located on the side facing away from the friction surface of the pressure plate, specifically, outside the opening, a tilting moment is produced by the centrifugal force. That is, an increase in speed during rotation is accompanied by an increase in the tilting moment acting on the clearance indicator, and thus the friction clamping seat is strengthened. To make positive use of such centrifugal force action on the clearance indicator, the opening in the pressure plate for the wear detection section of the clearance indicator has a clamping seat section arranged in a manner shifted in the axial direction from the side of the pressure plate facing away from the friction surface toward the friction surface side of the pressure plate. Shifting the friction clamp section toward the friction surface side of the pressure plate enlarges the axial distance between the center of mass of the clearance indicator and the clamping seat section, compared with the prior art as in DE 43 06 688 A1. In the pressure plate arrangement according to the prior art document, the clamping seat section is arranged on the rear side of the pressure plate facing away from the friction surface; where there is a special need for the clamping seat section to be arranged, because the helical compression spring discussed earlier must also be provided between the pressure plate and the free end of the wear detection section of the clearance indicator.

Shifting the clamping seat section in accordance with the invention makes it possible to select, depending on the axial position of the clamping seat, the desired centrifugal force support in producing the bias force. In addition, the axial distance between the bias element according to the invention and the clamping seat section is enlarged when the bias element acts on the side of the pressure plate facing away from the friction surface on the clearance indicator. Thus, thanks to the reinforced lever effect, it is possible to attain an improved friction clamping seat by means of the bias element even though the bias force remains the same.

The lever action becomes especially effective when the clamping seat section is arranged in the opening in the pressure plate adjacent to the friction surface side of the pressure plate, because it is then that the lever effect is strongest.

According to another embodiment of the present invention, the opening in the pressure plate for the wear detection section of the clearance indicator can have a clamping seat section, and the clamping seat section can be arranged in a manner shifted in the axial direction from the side of the pressure plate on which the bias element acts on the clearance indicator(s) to the other axial side of the pressure plate. An embodiment of this sort ensures optimal use of the spring force action of the bias element, because of the axial distance between the point of action of the bias element on the clearance indicator and the clamping seat section.

It should be noted that it is advantageous, but not necessary, to produce a lever effect between the bias element and the clamping seat section by means of the axial movement of the clamping seat section and/or to produce a lever effect by means of the axial distance between the center of gravity of the clearance indicator and the clamping seat section, in conjunction with a bias element that acts orthogonally relative to the rotational axis. It is also possible for force actions on the clearance indicator that are directed at an inclination relative to the rotational axis or a longitudinal axis of the clearance indicator to produce a tilting moment and a correspondingly secure clamping seat effect.

The present invention also relates to a pressure plate assembly, in which the bias element comprises an elastically deformable, preferably substantially U-shaped spring clamping part.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is described below in detail in reference to preferred embodiments and the accompanying drawings.

DETAILED DESCRIPTION OF THE PRESENTLY PREFERRED EMBODIMENTS

Figure 1:
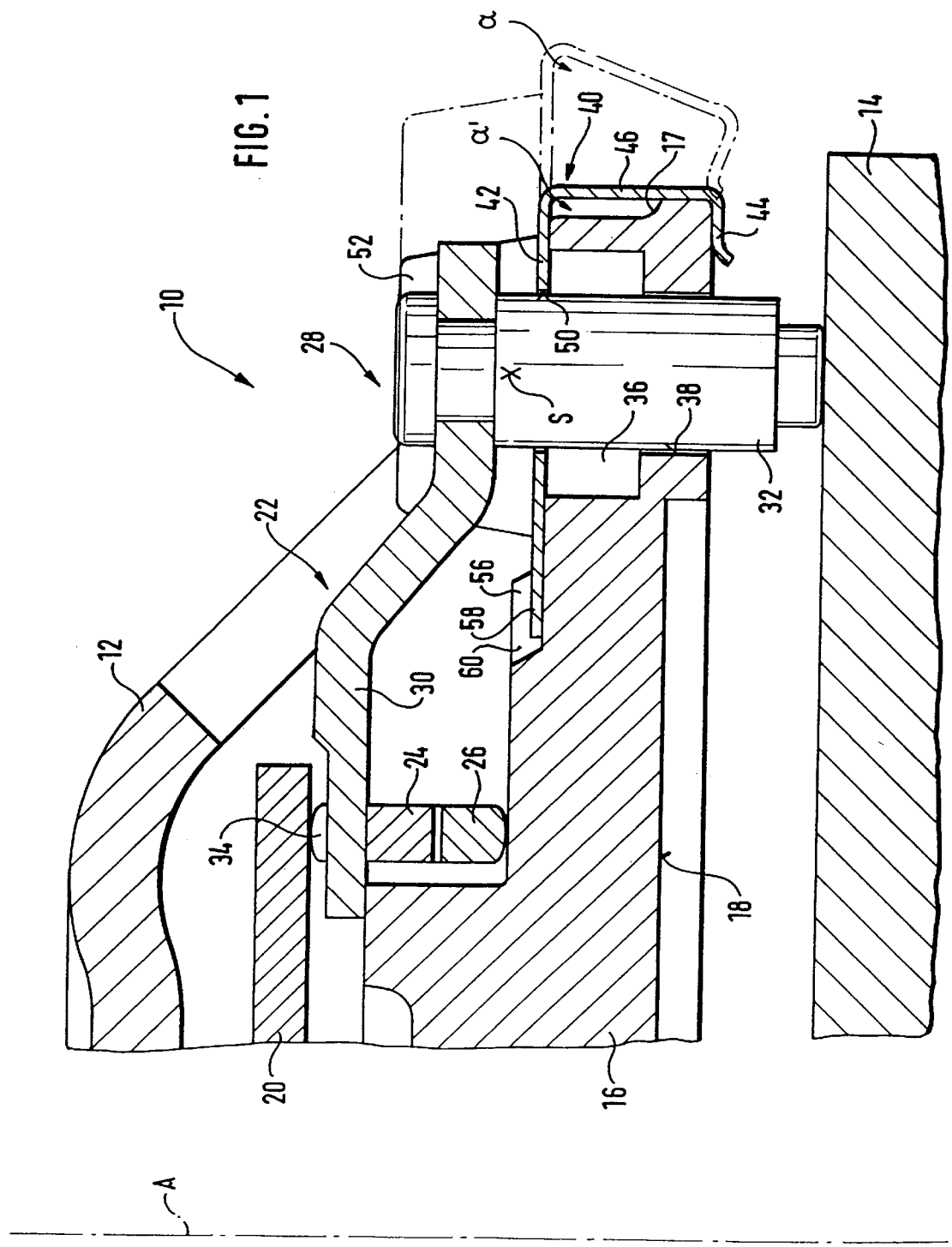
FIG. 1 is a partial longitudinal section view of a pressure plate assembly according to an embodiment of the present invention.
Figure 2:
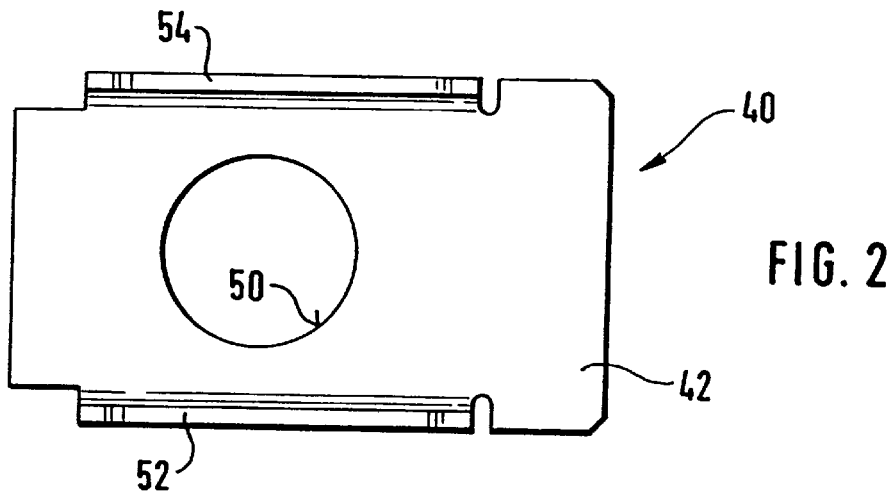
FIG. 2 is a top view of a spring part of the pressure plate assembly of FIG. 1.
Figure 3:
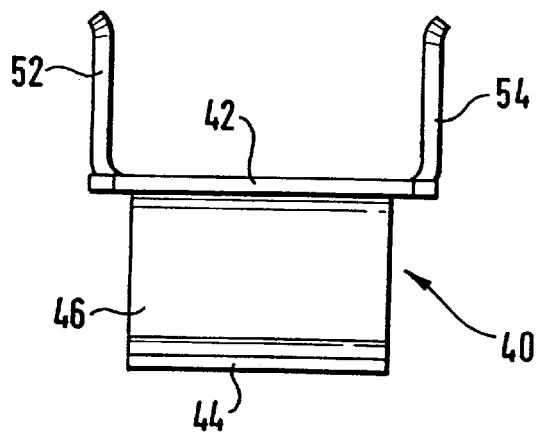
FIG. 3 is a front view of the spring part seen in direction III in FIG. 4.
Figure 4:
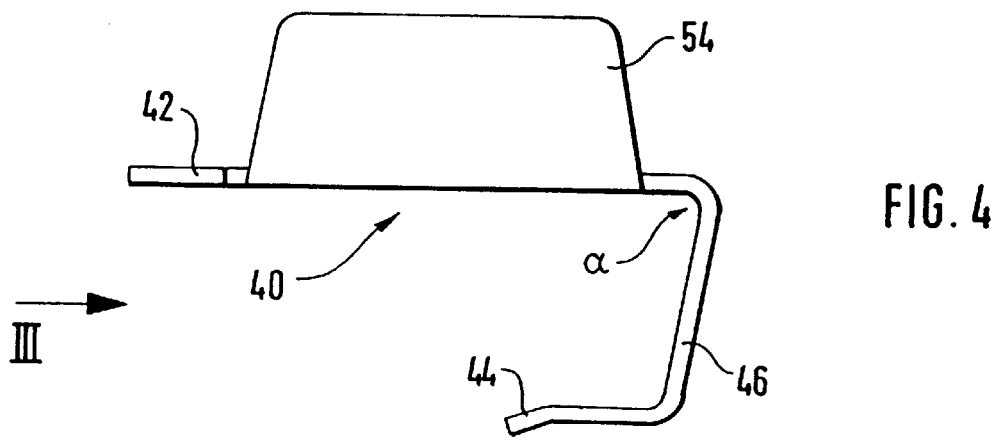
FIG. 4 is a side view of the spring part.

Referring to FIG. 1, a pressure plate assembly 10 comprises a housing 12, which is fixedly connected to a flywheel 14 (shown schematically in FIG. 1) in an outer circumferential area and which can be rotated with the flywheel 14 about a rotational axis A.

A pressure plate 16 is arranged in the housing 12. The pressure plate 16 is connected to the housing 12 in a rotation-proof fashion by tangential leaf springs (not shown), but is axially movable relative to the housing 12. The pressure plate 16 has a friction surface 18, which presses a clutch disk against the flywheel 14 when the clutch is in an engaged position.

The pressure plate assembly 10 further comprises a diaphragm spring 20. A radially inner section of the diaphragm spring 20 is supported on the housing 12 and a radially outer section of the diaphragm spring 20 rests, via a wear compensation device 22, on the pressure plate 16. The wear compensation device 22 comprises two adjustment rings 24, 26, which are rotatable around the rotational axis A and can be moved relative to each other. The wear compensation device 22 has a known design, in which the adjustment rings 24, 26 rest on each other via their respective slanted surfaces and, when rotated relative to each other, cause an axial lengthening of the wear compensation device 22, as the result of the reciprocal sliding off of their slanted surfaces.

The rings 24, 26 are biased against each other by springs not shown in this drawing. In the engaged state, the adjustment rings 24, 26 are pressured by the diaphragm spring 20 in such a way that an axial lengthening of the wear compensation device 22 cannot take place.

Furthermore, pressure plate assembly 10 includes a clearance indicator 28 with an activating lever section 30 and a wear detection section 32. The activating lever section 30 extends radially inward from clearance indicator 28 and an inner end of activating lever section 30 rests on the adjustment ring 24 near the diaphragm spring. The activating lever section 30 engages a recess 34 in the adjustment ring 24. At its radially outer end, the activating lever section 30 is fixedly connected to the wear detection section 32. For the purpose of detecting wear, the wear detection section 32 extends through an axial opening 36 in the pressure plate 16 and rests with its free end on the flywheel 14.

The axial opening 36 has a clamping seat section 38, which is arranged in the axial opening 36, close to the friction surface 18 side of the pressure plate 16.

Furthermore, a spring part 40 having a virtually U-shaped cross-section includes a first U-leg 42, a second U-leg 44 and a bottom section 46 that connects the first and second U-legs 42, 44. The first U-leg 42 rests on the side of the pressure plate 16 facing away from the friction surface 18. The second U-leg 44 rests on the pressure plate 16 on the friction surface 18 side. The bottom section 46 rests on an outer circumferential section 17 of the pressure plate 16.

As FIG. 1 also shows, the first U-leg 42 has an opening 50, through which the wear detection section 32 of the clearance indicator 28 is inserted. In terms of extension, the second U-leg 44 is clearly shorter than the first U-leg 42, so that the second U-leg 44 does not reach radially to the region of the wear detection section 32 in the axial opening 36.

FIG. 1 shows the spring part 40 in two positions. The position shown by solid lines corresponds to a position on the pressure plate 16 in which the spring part 40 biases the clearance indicator 28 in its friction clamping seat in the clamping seat section 38 of the opening 36. The position shown in broken lines corresponds to a position immediately before the spring part 40 is set onto the pressure plate 16.

It can be seen in FIG. 1 that an angle α formed between the first U-leg 42 and the bottom section 46 when the spring part 40 is not moved completely onto the pressure plate 16 is smaller than 90 degrees, for example, in the range of 60 to 70 degrees. When the spring part 40 is moved completely onto the pressure plate 16 (and the clearance indicator 22 penetrates with its wear detection section 32 through the opening 50 in the spring part 40 and the opening 36 in the pressure plate 16), the angle α' between the first U-leg 42 and the bottom section 46 is enlarged and is preferably substantially 90 degrees. Because the spring part 40 is made of an elastically deformable material such as, for example, spring steel or the like, this expanded spring part 40, which rests with its opening 50 on the clearance indicator 28 and with its bottom section 46 on the outer circumferential area 17 of the pressure plate 16, produces a tilting moment of the clearance indicator 28 in the clamping seat section 38 in the clockwise direction. The clearance indicator 28 is subjected by the spring part 40 only to a force that is directed radially relative to the rotational axis A. That is, the spring part 40 produces no force action in the axial direction of rotational axis A. As a result, the wear detection characteristic of the clearance indicator 28 is not impaired by axial propellant forces acting upon it. Furthermore, the radial bias force from the spring part 40 can be adjusted in such a way that, in all operating states of a motor vehicle friction clutch equipped with such a pressure plate assembly 10, the friction clamping seat of the clearance indicator 28 is protected against unintentional release. Besides being radial with respect to the rotational axis A, it is also important that the spring part 40 acts in a direction that is substantially orthogonal relative to the movement direction of the wear detection section 32 in the opening 36.

FIG. 1 also shows that there is a relatively large axial distance between a center of mass S of the clearance indicator 28 and the clamping seat section 38 in the opening 36. On the one hand, this means that even a spring part 40 embodied with a relatively weak spring force can, thanks to the relatively great lever effect, produce a strong friction clamping seat. In addition, however, due to this lever effect, the centrifugal force occurring during clutch operation can also help to strengthen the friction clamping seat effect. The greater the axial distance between the center of mass S and the clamping seat section 38, the stronger this effect becomes. By suitable selection of the axial position of the clamping seat section in the opening 36, it is possible to adjust the friction clamping seat effect to the desired operating characteristics. In other words, depending on the axial position of the clamping seat section, it is possible to strengthen the clamping force provided by the spring part 20 and, at the same time, to strengthen or reduce the additional clamping force produced by centrifugal force during rotation of the clutch, when the clamping section 38 is moved from the position shown in FIG. 1 closer to the side of the pressure plate 16 facing away from the friction surface 18. As already noted, the radially inner end of the activating lever section 30 engages a recess 34 in the adjustment ring 24 located on the diaphragm spring side. As a result, reciprocal interference is avoided between the activating lever section 30 and the diaphragm spring 20 that also rests on the adjustment ring 24. Furthermore, this measure helps to secure the adjustment ring 24 against rotation, since the ring 24 is fixed in place by the activating lever section 30 in the circumferential direction. For wear adjustment, the pressure plate side adjustment ring 26 is then rotated relative to the adjustment ring 24. The general operation of wear compensation devices 22 is known in the prior art, so that no detailed description is necessary here.

However, to prevent the ring 24 from rotating in the circumferential direction and taking along the activating lever section and thus rotating the entire clearance indicator 28 in the opening 36 when a wear adjustment is carried out, the pressure plate assembly according to the invention also protects against rotation for the clearance indicator 28.

FIGS. 1 to 4 show two upwardly projecting wall sections 52, 54 on the first U-leg 42 of the spring part 40. The lateral distance between the wall sections 52, 54 corresponds approximately to the width of the spring part 40 and is selected to roughly match the width of the activating lever section 30 of the clearance indicator 28. Rotation of the clearance indicator 28 relative to the spring part 40 is prevented by the wall sections 52, 54, which form lateral stops for the activating lever section 30, and because the wear detection section 32 of the clearance indicator 28 penetrates through the opening 50 in the spring part 40.

It should be mentioned that the wall sections can be embodied in various manners. For example, it is possible to provide only one such wall section or axially projecting part on the spring part 40, which projects upward and then engages into a matching opening in the clearance indicator, i.e., in the activating lever section 30. However, the embodiment shown in the drawings is preferred, because it requires no structural changes in the activating lever section 30. This activating lever section 30 can then be embodied as needed and best for its function. In particular, by avoiding any openings in the activating lever section 30, it is possible to prevent weakness of the same.

Referring again to FIG. 1, to prevent the spring part 40, which protects the clearance indicator 28 against rotation, from rotating together with the clearance indicator 28, a substantially radial recess 56 is formed on the pressure plate 16. The substantially radial recess 56 is positioned for receiving a radially inner end 58 of the first U-leg 42. The substantially radial recess 56 is limited in the circumferential direction by side walls (only one side wall 60 is shown in FIG. 1). Between the side walls, the radial inner end 58 of the first U-leg 42 is fixed in the circumferential direction. Thus, rotation of the spring part 40 is prevented by the engagement of radially inner end in the substantially radial recess, when the spring part 40 is moved onto the pressure plate 16, and the clearance indicator 28 penetrates with its wear detection section 32 through the opening 50 in the spring part 40 and the opening 36 in the pressure plate 16, even in the event of rotational force action on the activating lever section 30 of the clearance indicator 28.

Although the above description relates to a pressure plate assembly with only one clearance indicator 28, it goes without saying that several clearance indicators may be provided on the circumference of the pressure plate 16.

The present invention provides a pressure plate assembly in which, with extremely simple means, namely a spring part that acts on a clearance indicator in a radial direction with respect to a rational axis of the pressure plate, the clearance indicator is reliably fixed in a friction clamping seat on the pressure plate. Because the spring does not impart any axial forces on the clearance indicator, the force action provided by the spring part 40 on the clearance indicator can be set to an optimal value for producing the friction clamping seat, without the necessity of avoiding excessively large axial force actions that would impair the wear detection characteristic of the clearance indicator. The spring part makes the pressure plate arrangement according to the invention extremely easy to assemble, because it is not necessary, as in the prior art, to hold helical compression springs in a biased state prior to assembly and then, by the placement of bolt head elements of some sort, to secure said springs on the pressure plate. The spring part 40 needs only to be moved in the radial direction onto the pressure plate. After installation of the spring part on the pressure plate, the clearance indicator with its wear detection section is inserted into the opening in the spring part and the pressure plate.

Additionally, because the pressure plate assembly according to the invention provides an axial distance between the center of mass of the clearance indicator and the clamping seat section of the pressure plate, it is possible, first of all, for a relatively slight force action by the spring part to result in a strong friction clamp of the clearance indicator in the clamping seat section. Secondly, it becomes possible to strengthen the clamping seat effect by the centrifugal force that occurs during operation on the center of mass of the clearance indicator in interaction with the produced lever. By suitable axial positioning of the clamping seat section, it is possible to enlist one or both of the aforementioned force actions (by spring part or by centrifugal force) in the production of the friction clamping seat.

Although the pressure plate arrangement according to the invention is described above and depicted in the drawing in an embodiment for a clutch of the pressure type, the principle of the invention is, of course, applicable, in a manner clear to the expert, to clutches of any type in which such clearance indicators are provided for wear detection and wear compensation.

The invention is not limited by the embodiments described above which are presented as examples only but can be modified in various ways within the scope of protection defined by the appended patent claims.

I claim:

1. A pressure plate assembly for a motor vehicle friction clutch with automatic wear compensation, comprising:

a housing connectable to a flywheel for rotation therewith about a rotational axis of the flywheel;

a pressure plate having a friction surface and connected to said housing in a rotation-proof and axially movable fashion with respect to the rotational axis;

the friction surface of said pressure plate being operable for supporting friction linings of a clutch disk that is clampable between the flywheel and said pressure plate;

an energy storage device operatively mounted between the housing and the pressure plate for biasing the pressure plate toward an engaged clutch position;

a wear compensation device mounted intermediate said energy storage device and said pressure plate;

a clearance indicator having an activating lever and a wear detection section and axially movably mounted in an opening on said pressure plate, the activating lever interacting with said wear compensation device and the wear detection section penetrating the opening on said pressure plate and operatively connectable with the flywheel for detecting wear on the friction surface and friction linings; and a bias element operatively connected for axially fixing said clearance indicator in the opening by resiliently urging said clearance indicator via a force directed orthogonally to the rotational axis.

2. The pressure plate assembly of claim 1, wherein the force of said bias element is directed radially outward relative to the rotational axis.

3. The pressure plate assembly of claim 1, wherein said bias element acts on said clearance indicator on a side of the pressure plate that faces away from the friction surface.

4. The pressure plate assembly of claim 3, wherein said bias element acts on the wear detection section of said clearance indicator.

5. The pressure plate assembly of claim 3, the bias element comprises a bias spring element that acts on the clearance indicator and rests on an outer circumferential area of said pressure plate.

6. The pressure plate assembly of claim 5, wherein the bias spring element comprises an elastically deformable, substantially U-shaped spring part, and said U-shaped spring part comprises:

a first U-leg arranged on the side of said pressure plate that faces away from the friction surface and with which the bias spring part acts upon the clearance indicator;

a second U-leg arranged on the friction surface side of said pressure plate; and a bottom section connecting the first U-leg and the second U-leg and resting on an outer circumferential area of said pressure plate.

7. The pressure plate assembly of claim 6, wherein the first U-leg acting on the clearance indicator and the bottom section of the spring part acting on the outer circumferential area biases the spring part such that said spring part exerts a force directed radially outward on the clearance indicator.

8. The pressure plate arrangement of claim 7, wherein an angle between the first U-leg and the bottom part has a first value which is less that 90 degrees when the spring part is not on the pressure plate, and the angle between the first U-leg and the bottom section has a second value that is larger than the first value when the spring part is moved onto said pressure plate and biases the clearance indicator.

9. The pressure plate arrangement of claim 6, wherein the spring part includes an opening in its first U-leg into which the wear detection section of the clearance indicator is insertable, the spring part acting on the wear detection section of the clearance indicator.

10. The pressure plate assembly of claim 1, further comprising means on the for preventing rotation of the clearance indicator in the opening in said pressure plate around an axis that is substantially parallel to the rotational axis.

11. The pressure plate assembly of claim 10, wherein said means for preventing rotation comprise at least one securing section integrally embodied with the first U-leg and which acts on the activating lever section of the clearance indicator.

12. The pressure plate assembly of claim 6, wherein said means for preventing rotation of the spring part around an axis substantially parallel to the rotational axis.

13. The pressure plate assembly of claim 12, wherein said means for preventing rotation comprise a recess extending substantially radially on said pressure plate and operatively positioned for receiving a radially inner end section of the first U-leg of the spring part.

14. The pressure plate assembly claim 13, wherein the recess is positioned on a side of said pressure plate that faces away from the friction surface.

15. The pressure plate assembly of claim 6 wherein the spring part comprises spring steel.

16. The pressure plate assembly of claim 1 wherein the opening in said pressure plate comprises a clamping seat section arranged in a position that is shifted in the axial direction from the side of the pressure plate that faces away from the friction surface toward the friction surface side of the pressure plate.

17. The pressure plate assembly of claim 16, wherein the clamping seat section is positioned in the opening in the pressure plate adjacent the friction surface side of the pressure plate.

18. The pressure plate assembly of claim 1, wherein the opening in the pressure plate for the wear detection section of the clearance indicator has a clamping seat section positioned such that it is shifted in the axial direction from the side of the pressure plate on which the bias element acts on the clearance indicator toward the other respective side of the pressure plate.

19. A pressure plate assembly for a motor vehicle friction clutch with automatic wear compensation, comprising:

a housing connectable to a flywheel for rotation therewith about a rotational axis of the flywheel;

a pressure plate having a friction surface and connected to said housing in a rotation-proof and axially movable fashion with respect to the rotational axis;

the friction surface of said pressure plate being operable for supporting friction linings of a clutch disk that is clampable between the flywheel and said pressure plate;

an energy storage device operatively mounted between the housing and the pressure plate for biasing the pressure plate toward an engaged clutch position;

a wear compensation device mounted intermediate said diaphragm spring and said pressure plate;

a clearance indicator having an activating lever and a wear detection section and axially movably mounted in an opening on said pressure plate, the activating lever interacting with said wear compensation device and the wear detection section penetrating the opening on said pressure plate and operatively connectable with the flywheel for detecting wear on the friction surface and friction linings; and a bias element operatively connected for axially fixing said clearance indicator in the opening, the bias element comprising a U-shaped spring clamping part.

* * * * *